US 6,721,496 B2

United States Patent
Smith

(10) Patent No.: US 6,721,496 B2
(45) Date of Patent: Apr. 13, 2004

(54) ELECTRICAL RESONANCE CIRCUITS FOR HIGH EFFICIENCY DIRECT CURRENT MOTORS

(76) Inventor: Marcus Allen Smith, 502 Pinewood Dr., Beckley, WV (US) 25801

( * ) Notice: Subject to any disclaimer, the term of this patent is extended or adjusted under 35 U.S.C. 154(b) by 143 days.

(21) Appl. No.: 09/983,363

(22) Filed: Oct. 24, 2001

(65) Prior Publication Data

US 2003/0077077 A1 Apr. 24, 2003

(51) Int. Cl.[7] .................................................. H02P 5/00
(52) U.S. Cl. ...................... 388/800; 388/806; 388/807; 388/928.1
(58) Field of Search ................................. 388/800, 806, 388/807, 928.1

(56) References Cited

U.S. PATENT DOCUMENTS

| | | | |
|---|---|---|---|
| 4,064,442 A | 12/1977 | Garron | |
| 4,167,691 A | 9/1979 | Sorensen et al. | |
| 4,406,002 A | * 9/1983 | Wine | 369/200 |
| 4,675,565 A | 6/1987 | Lewus | |
| 4,734,601 A | 3/1988 | Lewus | |
| 4,772,814 A | 9/1988 | Lewus | |
| 4,794,288 A | 12/1988 | Lewus | |
| 4,808,868 A | 2/1989 | Roberts | |
| 4,959,573 A | 9/1990 | Roberts | |
| 6,545,443 B2 | * 4/2003 | Kushida | |

* cited by examiner

Primary Examiner—Karen Masih
(74) Attorney, Agent, or Firm—Millen, White, Zelano & Branigan, P.C.

(57) ABSTRACT

Practically ideal electrical resonance is employed to soley provide armature power, and stator power if desired, to run DC motors. A practically ideal parallel resonant tank circuit (PIPRC) is used wherein the quotient of the "tank current" divided by the "line current" (called the "quality" or "Q" of the tank) is (1) greater than one, (2) large enough to allow the percent efficiency of the electric motor to be equal to or greater than 95%, and (3) removes enough back emf or enough of the influence thereof so that criteria (1) and (2) can be realized throughout the entire operating range of the motor. Only one PIPRC is needed for a DC motor. Recontrolling and/or redesigning is done for two reasons. First, since DC motors change effective impedance, because of back emf variations, when their speed changes, controls are implemented to ensure that the tank circuit always meets criterion (3), and therefore criteria (1) and (2), thereby maintaining a PIPRC, regardless of how frequent or to what degree speed is changed. Secondly, this first control has the effect of negating the normal ability of a D.C. motor to draw different currents for driving different loads. Therefore, the way current is supplied to the motor is also recontrolled.

16 Claims, 14 Drawing Sheets

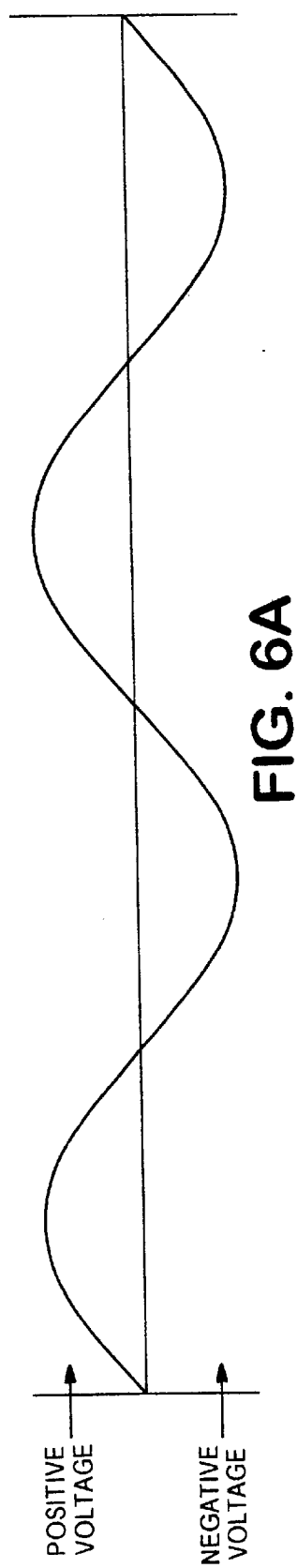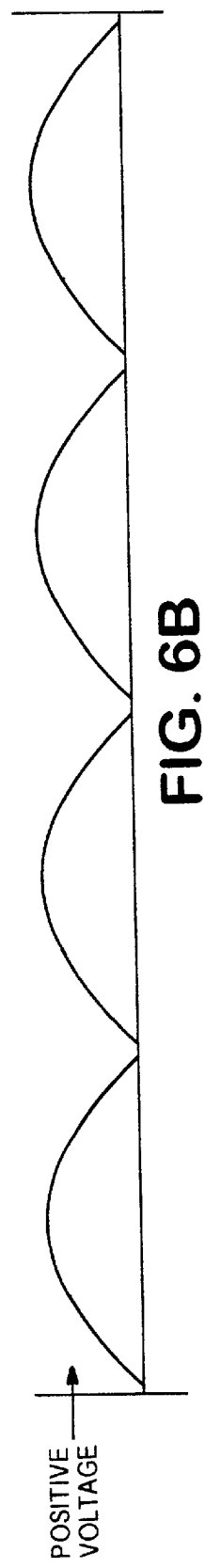

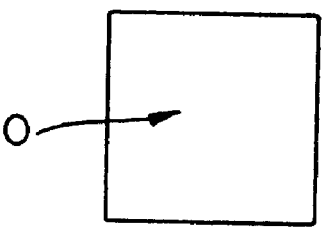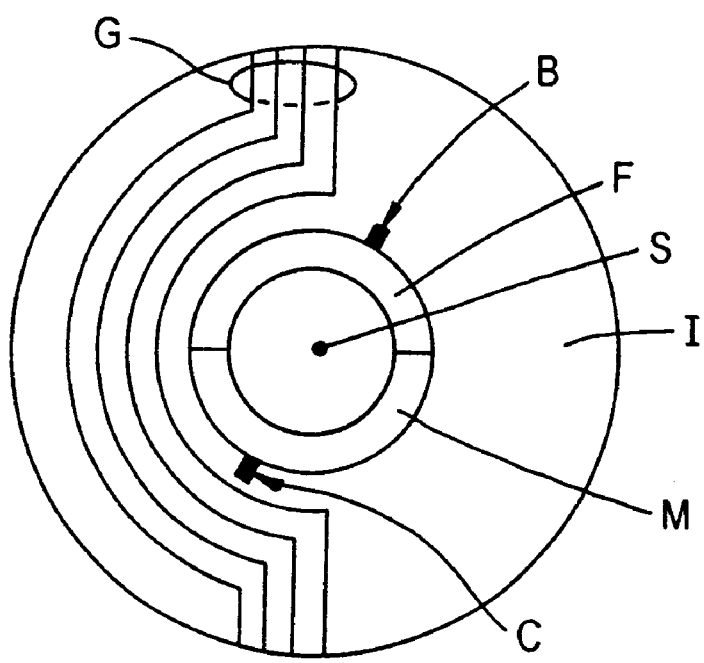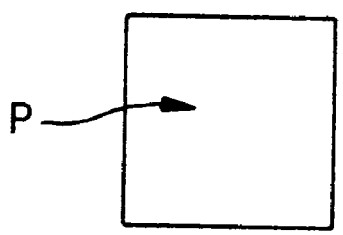
FIG. 10

ELECTRICAL RESONANCE CIRCUITS FOR HIGH EFFICIENCY DIRECT CURRENT MOTORS

FIELD OF THE INVENTION

The present invention relates to permanent magnet, shunt, series, and compound direct current motors. More particularly, the present invention relates to enhancing the efficiency of direct current electrical motors by using electrical resonance circuitry.

BACKGROUND OF THE INVENTION

Electrical motors are rated by their efficiency. Efficiency is simply the quotient of the mechanical power output, divided by the electrical power input.

$$\text{Efficiency} = \frac{\text{Mechanical power output}}{\text{Electrical power input}}$$

To get a percent efficiency, the quotient is simply multiplied by 100.

$$\text{Percent Efficiency} = (100) \times \frac{\text{Mechanical power output}}{\text{Electrical power input}}$$

High efficiency motors that are on the market today, usually operate with efficiency maximums of about 97%. However, there are motors that have higher efficiencies. U.S. patents have been issued for devices that claim to approach efficiencies of 100%.

Since electric motors are used by the hundreds of millions in a myriad of applications even slight improvements in the efficiencies of electric motors save an enormous amount of electrical energy. Since much of this energy is generated from fossil fuels, increases in the efficiencies of electric motors have considerable positive environmental impacts.

Using electrical resonant circuits to drive or otherwise control electric motors is known, however these arrangements have drawbacks such as using a mandatory permanent magnet in the rotor and stator, which have fluxes that are alternatively shorted out and added to by a separate electromagnets in the rotor and stator; powering the motor with a DC battery, and having to adjust the motor's load or the capacitors to keep the machine at proper resonance.

Other prior art arrangements use brushless DC motors that have permanent magnets as rotors and use a LC resonant oscillator to constantly change the magnetic polarities of the stator poles in order to keep the rotor moving with the LC resonant oscillator alternatively switched on and off.

The prior art also includes single phase AC motors powered by parallel resonant circuits, and resonant series circuits as well as polyphase AC motors powered by quasi-parallel and series resonant circuits and by quasi-parallel and series resonant circuits.

SUMMARY OF THE INVENTION

The present invention is directed to an arrangement for powering a DC motor with an AC source comprising a parallel resonant tank circuit connected to the AC source, the parallel resonant tank circuit having a capacitive branch and an inductive branch connected in parallel to generate a resonanting tank current. A rectifier is connected to the parallel resonant circuit to transform the AC voltage to DC voltage, and the DC motor has its armature and if desired its stator, connected to the rectifier to receive DC voltage therefrom.

In further aspects of the invention, the rectifier of the parallel resonant tank circuit is a full wave rectifier electrically connected in series with one of the two branches of the parallel resonant tank circuit. In addition, the parallel resonant tank circuit contains an optional voltage balancing circuit electrically connected in series with one of the branches of the circuit opposite to that in which the full wave rectifier is located, the voltage balancing circuit having a voltage drop thereacross substantially equaling the voltage drop across the full wave rectifier.

In still a further aspect of the invention, the DC output of the full wave rectifier is electrically connected to the DC motor with a variable DC voltage between the full wave rectifier and a connection to the input terminals of the DC motor so as to automatically vary the DC voltage to minimize the influence of back emf of the DC motor.

In further aspects of the invention, a secondary armature is on the rotating shaft of the DC motor, the secondary armature having an armature core which has the same number of windings as a first armature, each secondary armature winding being dedicated to the removal of the AC voltage on one main armature winding to minimize back emf. And in still a further aspect of the invention, a secondary stator is disposed around the secondary armature, the secondary stator having as many stator windings as a first stator first.

In an additional aspect of the invention, a bank of transformers is positioned on the shaft of the DC motor, each transformer having a primary winding and secondary winding, the number of transformers being equal to the number of secondary armature windings with each transformer being dedicated to one secondary armature winding, and therefore dedicated to one main armature winding.

In an additional aspect of the invention, a rotor speed detection means constantly monitors the rotor speed of the DC motor and sends a signal representative of the rotor speed to an electronic apparatus which computes the needed value of a variable DC source element or a variable DC motor element, and sends out a signal that varies this adjustable element to minimize back emf.

According to additional aspects of the invention, current flowing through the brush, the commutator, the armature winding, and the stator winding is varied by varying the voltage of the AC source and speed and torque is varied by varying the voltage of the AC source and/or the magnetic field intensity of the stator windings.

DEFINITIONS (1) DC means direct current and voltage. The current normally flows in one direction, and the voltage normally has one polarity. The opposite of AC.

(2) AC means alternating current and voltage. The current normally and rhythmically alternates direction of travel, and the voltage normally and rhythmically alternates polarity. The opposite of DC.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIGS. 6a, 6b, and 6c are illustrative plots of magnitude versus time of an AC signal, a full wave rectified AC signal, and a filtered and rectified AC signal, respectively;

FIG. 10 is an illustration of the frontal view of the motor of FIG. 9;

Detailed Description

Figure 1A:
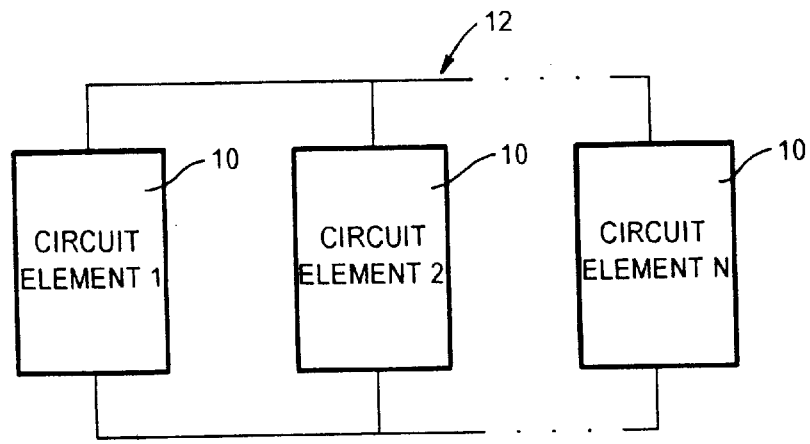
FIGS. 1*a*, 1*b*, 1*c*, and 1*d* are respectively: an electrical parallel circuit without a voltage source; an electrical parallel circuit with a voltage source; an electrical series circuit without a voltage source, and an electrical series circuit with a voltage source.
Figure 1B:
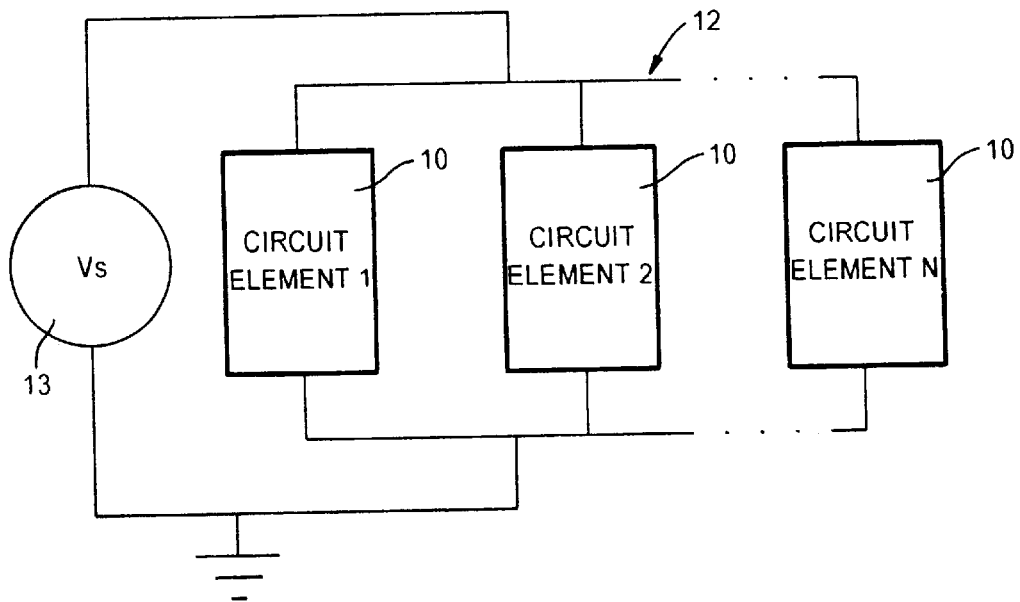
Figure 1C:
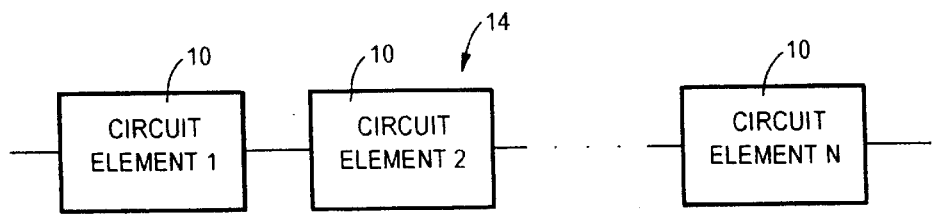
Figure 1D:
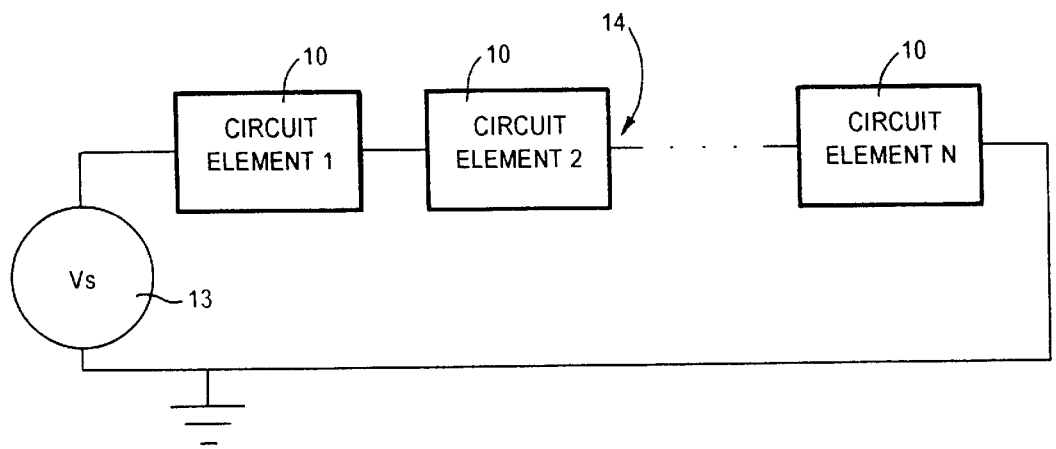
Figure 2:
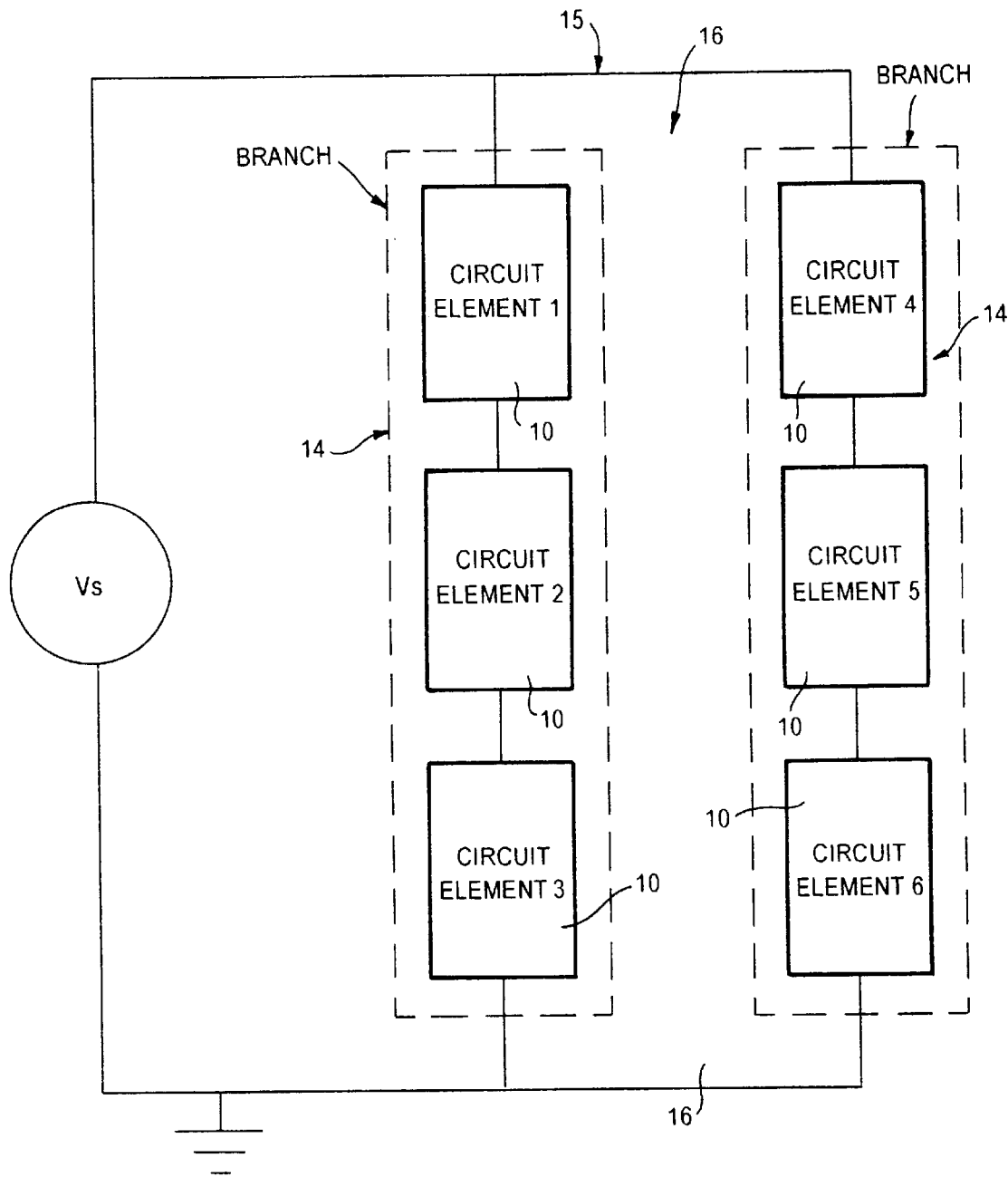
FIG. 2 is a parallel and series combination circuit.
Figure 3:
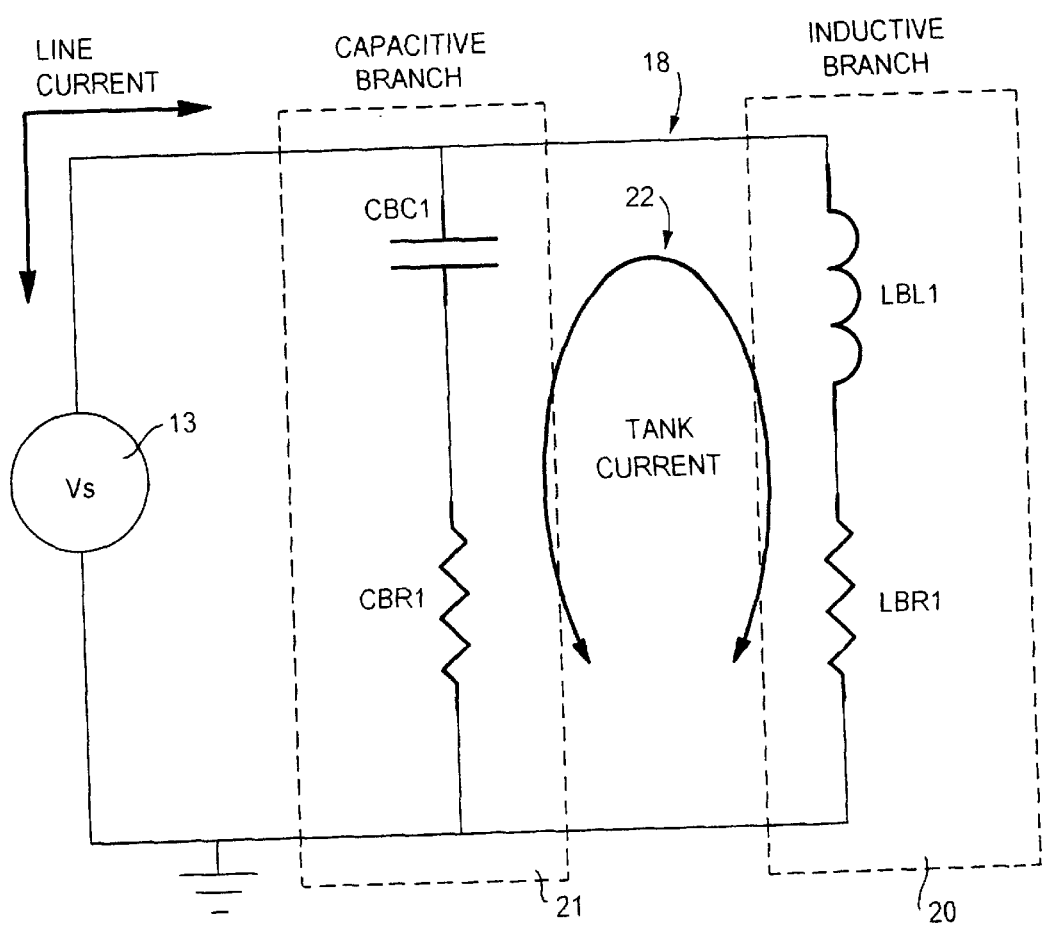
FIG. 3 is an electrical parallel resonant circuit.

FIGS. 1–3 Review of Parallel Circuits, Series Circuits, and Parallel Resonant Circuits An understanding of parallel circuits, series circuits, and parallel resonant circuits is helpful in understanding this invention.

Two or more electrical circuit elements 10 are said to be in parallel when they are connected in the parallel configuration 12 shown in FIG. 1a. When a voltage source 13, whether AC or DC, is connected across this circuit arrangement 12 you have a complete circuit as shown in FIG. 1B. In the circuit arrangement 12, all circuit elements 10 will at all times have the same voltage across their terminals. The current in each element 10 may vary in magnitude and/or phase depending on the type of circuit element. Similarly, two or more electrical circuit elements 10 are said to be in series, when they are connected in the series configuration 14 shown in FIG. 1C. When the source 13 is connected as in FIG. 1D, there will be one common current traveling through all circuit elements 10. The voltage across each circuit element 10 may vary in magnitude and/or phase depending on the type of circuit element.

A circuit can also have combinations of parallel and series circuits as the combination circuit 15 shown in FIG. 2. In the combination circuit 15, two series circuits 14, each having three elements 10 each, are connected in parallel with each other. The first series circuit 14 consists of three circuit elements 10 and the second series circuit 14 consists of three circuit elements. Each series circuit 14 is one branch of a parallel circuit 16. Therefore, this is a two branch parallel circuit 15, with one three element series circuit 14 making up each branch.

An electrical parallel resonant circuit 18 is shown in FIG. 3 in which an inductive branch 20 connected in parallel with a capacitive branch 21. The inductive branch consists of an inductor LBL1 and resistor LBR1, connected in series. The capacitive branch consists of a capacitor CBC1 and resistor CBR1, connected in series. The voltage source Vs must be an AC source operating at or very close to a unique frequency to cause this circuit to resonate. This unique frequency, called the resonant frequency, is defined as the one frequency at which the inductive reactance of the circuit equals the capacitive reactance. The magnitude of the reactance of an inductor (XL) can be expressed mathematically as:

$$XL=(2)(pi)(\text{frequency in Hertz})(\text{inductance in Henries}) \text{ Ohms}. (pi \text{ equals } 3.14).$$

Similarly, the magnitude of the reactance of a capacitor (XC) can be expressed mathematically as:

$$XC=1/[(2)(pi)(\text{frequency in Hertz})(\text{capacitance in Farads})]\text{Ohms}.$$

Therefore, the equation that describes resonance for this circuit is:

$$XLBL1=XCBC1$$

Solving for the term "frequency in Hertz: (f), it is seen that:

$$f=1/(2 \times pi \times (\text{square root of } (L \times C))).$$

This is the frequency that will cause this circuit 18 to resonate. This resonant frequency is denoted as "fr". Notice that resistors LBR1 and CBR1 have no effect on fr. The circuit will resonate at fr regardless of their Ohmic values. The resistors are important however, because they effect how close to "ideal" the tank circuit is as discussed hereinafter.

If LBL1 is set equal 100×10E-6 Henries (H) (E means exponent or to the power of) and CBC1 to be 10×10E-3 Farads (F), fr equals 159.15 Hertz (Hz), and XLBL1 and XCBC1 equal 0.1 Ohms and if the frequency of Vs equals fr and Vs has a magnitude of 1 Volt (V), while the resistors LBR1 and CBR1 each equal 0.01 Ohms, the circuit will operate with a line current equal to 1.98 Amperes (Amps or A), a tank current equal to 9.95 A. This shows a physical phenomenon of parallel resonance; that is, when it is correctly designed it can maintain more current in the tank than what the source 13 has to supply. The quotient of tank current divided by line current is called the "Quality" or "Q" of the tank circuit 18. In this example Q equals 5.03. The higher the value of Q, the higher the efficiency of the tank circuit.

If, however, LBR1 and CBR1 are both changed to equal 0.05 Ohms, the line current equals 8 A and tank current equals 8.94 A, Q drops to 1.11. This shows that the resistors do not effect fr, but they do effect the Q and thus the efficiency of the tank at resonance.

The Q and efficiency of this circuit can be increased by increasing XLBL1 and XCBC1. Changing LBL1 to 1000× 10E-6 H, causes fr to be 50.33 Hz, and XLBL1 and XCBC1 to equal 0.32 Ohms. The line current equals 0.98 A, tank current equals 3.12 A and Q equals 3.2. Therefore, it is the relationship of reactance to resistance that determines the Q and increases the efficiency of the tank circuit.

The circuits of FIGS. 1–3, can now be used to show the advantages of the present invention. Consider a DC motor that is 80% efficient. Eighty percent efficiency means that 20% of input power is lost. For a motor of this efficiency, the circuit of FIG. 3, with the original circuit values in the discussing of FIGS. 1–3, would be an example of a practically ideal parallel resonance tank circuit (PIPRC) by meeting the three criteria thereof. The first criterion is for Q to be greater than 1. It is obvious from the analysis in FIGS. 1–3 that the Q of this circuit is 5. The second criterion is for Q to be large enough to allow the total motor percent efficiency to be equal to or greater than 95%. The third criterion is having means provided to remove enough back emf or enough of the influence thereof so that criteria (1) and (2) can be realized throughout the entire operating range of the motor.

The Adverse Effect of Normal DC Motor Operation on the PIPRC

The PIPRC must be maintained over the entire operating range of a DC motor so that the present invention can produce percent efficiencies equal to or greater than 95%.

When a DC voltage source is applied to a DC motor, it begins to pull current out of the source and the rotor or armature begins to rotate. As it rotates, it generates a "backwards" voltage that is frequently called "back electromotive force" (back emf) or "counter electromotive force" (cemf). This back emf opposes the DC source. The magnitude of the back emf is given by the equation:

back emf=magnetic field×ω×motor constant, where the magnetic field is measured in Tesla's (B), ω is the speed of the armature in rpm, and "motor constant" is a number that is constant for a particular motor. This constant depends on how the motor is electrically constructed, and can vary widely from motor to motor. Those skilled in the art of electric motors know that the factors that determine this constant include: the radius of the armature, the length of the armature, the number of conductors, conversions between systems of units, etc. The back emf varies with changes in ω and the magnetic field. A way to explain how a DC source "sees" this back emf, is to say that it sees it as a resistance, or more exactly, a ω and magnetic field controlled variable resistance. Normal DC motors are turned into DC motors according to the present invention by putting a rectifier into the PIPRC to create a DC source, and then using this DC source to run the motor. The varying back emf would destroy the PIPRC because it acts like a resistor that increases and decreases based on the load. The damage that increasing resistance does to a PIPRC is demonstrated in the discussion of FIGS. 1–3. Even if the voltage of the back emf could be held constant, it would adversely effect the PIPRC because it would still act like a resistance, and the branch that contained the rectifier would be too unbalanced from the other branch. The vast majority of back emf, must therefore, be eliminated. Therefore, unless controls are implemented to remove enough back emf, the PIPRC would either be too unstable or vanish completely, and the advantages of the present invention could not be realized.

Figure 4:
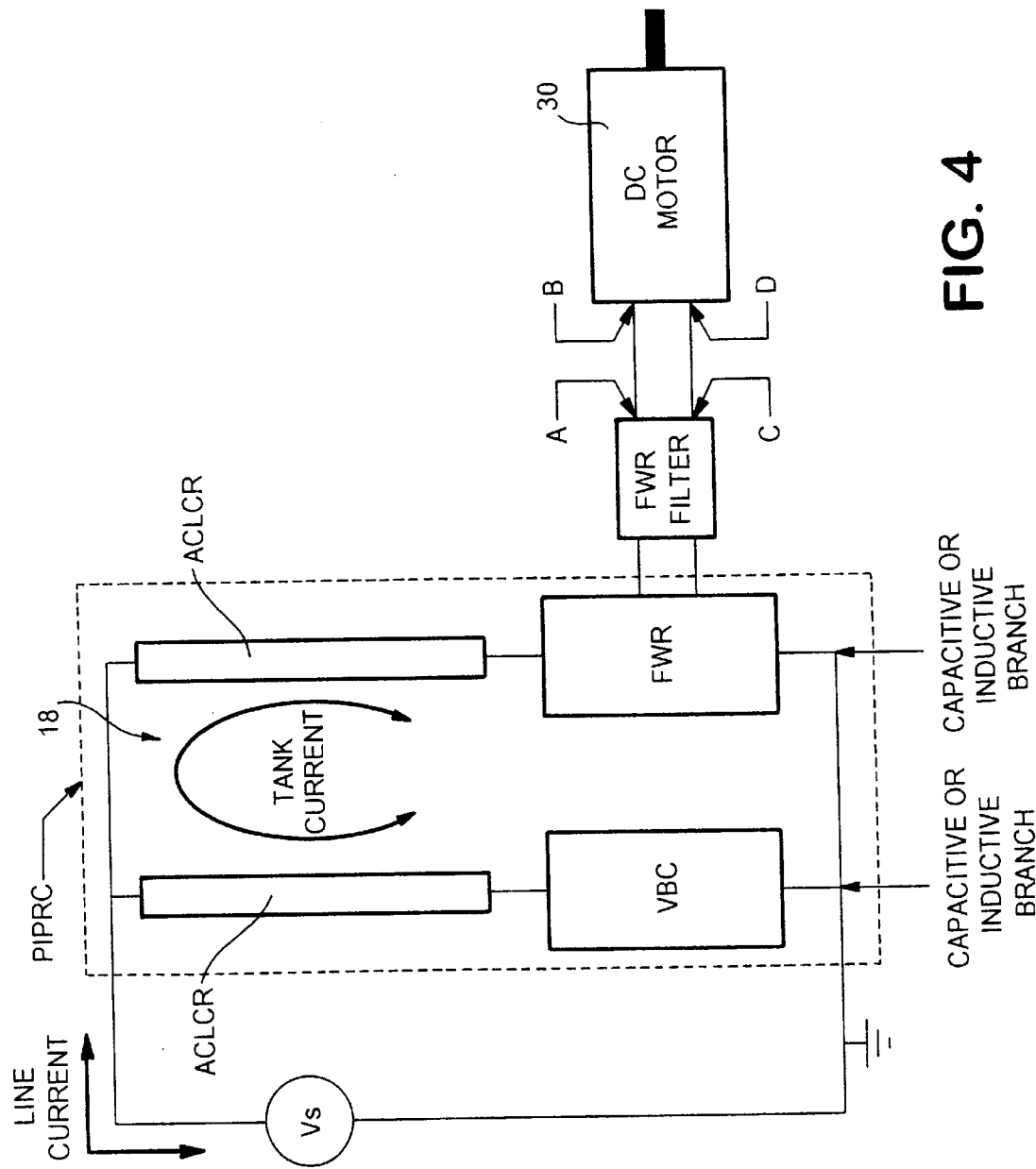
FIG. 4 is a general schematic of a complete electrical circuit according to the present invention.
Figure 5:
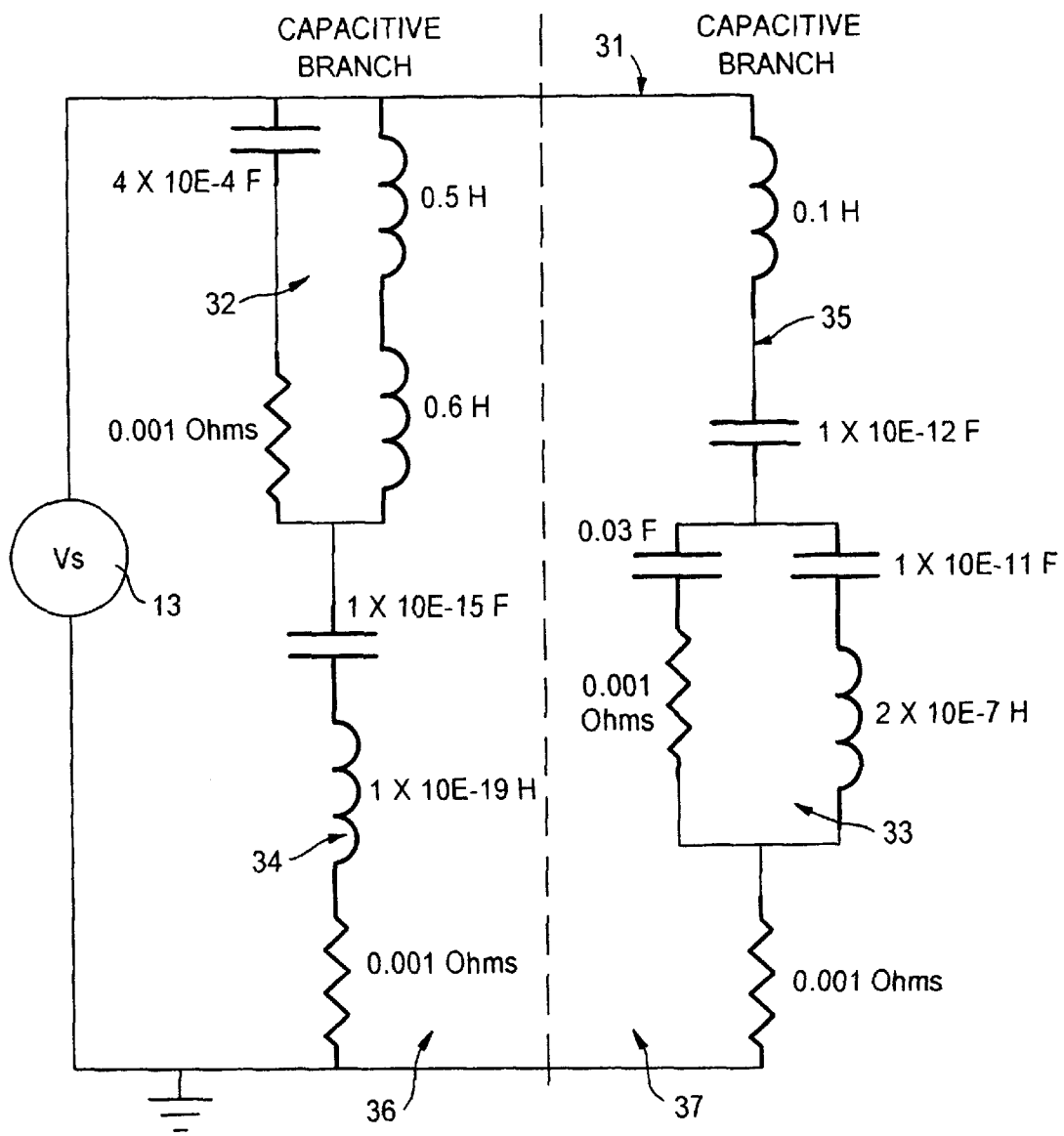
FIG. 5 is a more elaborate parallel resonant circuit than FIG. 3.

Discussion of FIGS. 4–6

A key function of the present invention is the ability to meet the criteria for the PIPRC throughout the entire operating range of a DC motor. There are three main operating modes of any electric motor: startup, normal operation, and breakdown. This invention is primarily designed to meet all of the criteria for the PIPRC during the normal operation mode of a motor. However, this invention may be designed to meet all of the criteria for the PIPRC either during the startup or breakdown modes, or both, in addition to the normal operation mode. The present invention applies to permanent magnet, shunt, series, and compound DC motors. The present invention applies to all current art in the construction of the stator, armature, steel laminations, as well as methods used to cool the motor. The present invention also applies to all current art in the remedy of field distortion due to armature reaction, including: interpoles, rotating the brush holder, and compensation windings. The present invention also applies to all current art in winding armatures, such as for example lap windings, wave windings and frogleg windings.

FIG. 4 shows a general electrical schematic of the present invention. As was previously stated, one PIPRC is used to drive a DC motor 30. One AC source, Vs, sends its voltage and current to the PIPRC with a frequency f. The PIPRC shown here has been modified to include any combination of inductor(s) (L), capacitor(s) (C), intentionally added resistor (s) (IR), and unintentional resistance (UR). Unintentional resistance comes from connections, internal resistance of inductors, capacitors, etc. This "any combination" is abbreviated ACLCR. Those skilled in the art of electrical circuits and resonance know that any combination of L, C, IR, and UR can be made to resonate. For example, FIG. 5 shows a parallel resonant circuit 31. It has smaller parallel circuits 32 and 33 and series circuits 34 and 35 inside of the overall parallel circuit. If Vs is set to have a frequency of 1.59×10E7 Hz, resonance will occur. The LCRs that make up the left side of the tank are actually the capacitive branch, and the LCRs on the right side 37 make up the inductive branch. The LCs to the left add and subtract from one another. The net result is the capacitive reactance is larger than inductive reactance, and therefore, the left side 36 acts as a capacitor. The LCs to the right side similarly add and subtract from one another, the net result being that the right side 37 acts as an inductor. At fr, 1.59×10E7 Hz, the capacitive branch's reactance and the inductive branch's reactance both equal 1.0005×10E7 Ohms, and parallel resonance occurs.

As AC tank current flows back and forth in the PIPRC, it flows back and forth through a full wave rectifier FWR. The positive and negative AC tank waveform, represented in FIG. 6a, is transformed to the positive "humpbacked" DC waveform represented by FIG. 6b by the FWR. The FWR will have some voltage drop across it. The voltage balancing circuit VBC of FIG. 4 is designed to put the same voltage drop, or nearly so, in the opposite branch of the PIPRC as shown. The VBC, is however, optional. If a designer wishes to not have a VBC, it is removed from FIG. 4 and the associated ACLCR connected to the ground node below, as is done in previous PIPRC circuits. The signal of FIG. 6b enters the full wave rectifier's filter, FWR filter. The FWR filter "smooths out" all, or nearly all, of the "humps" out of the "humpbacked" DC waveform, as is represented by FIG. 6c. The amount of "smoothing" that the filter does depends on the filter's design and can vary widely. This signal that leaves the FWR filter, therefore, is very nearly a pure DC voltage and current. The FWR filter is optional. A designer may wish to have no FWR filter and send the positive "humpbacked" DC waveform, FIG. 6B, to the DC motor 30.

The signal, filtered or unfiltered, is sent to the DC motor. As a DC signal is positive from terminal A to terminal C, that is, terminal A has some positive DC voltage and terminal C is zero voltage. Once the DC motor 30 begins to run, the motor would normally produce a back emf from terminal B to terminal D, that is, terminal B would be some positive DC voltage less than that on terminal A and terminal D would be zero voltage. This back emf would enter the tank circuit 18.

The DC motor 30, in accordance with this invention, must meet criterion three. Therefore, in order to remove enough back emf, two approaches are used. They are: (1) "insertion of variable voltage", and (2) "no back emf motor".

In the first method a variable DC voltage is inserted between terminals A and B or between C and D or both. The inserted voltage is polarized so that it adds to the voltage leaving terminals A and C. Its magnitude must equal the average back emf voltage (ABE) coming out of the motor at terminals B and D for a given motor speed ω and magnetic field, or be close enough to ABE, so that criterion three for PIPRC is met. The motor's back emf voltage will have a ripple, the amount of ripple varying widely over different motor designs. This ripple could for example resemble FIG. 6*b* and have a constant average. The variable DC voltage is equal to this average, or close enough to this average so that criterion three is met.

ABE varies as the motor's speed and magnetic field varies, and the inserted DC voltage varies with ABE so that criterion three is met over the operating range of the motor. Two ways of accomplishing this are shown in FIGS. 7 and 8.

Figure 7:
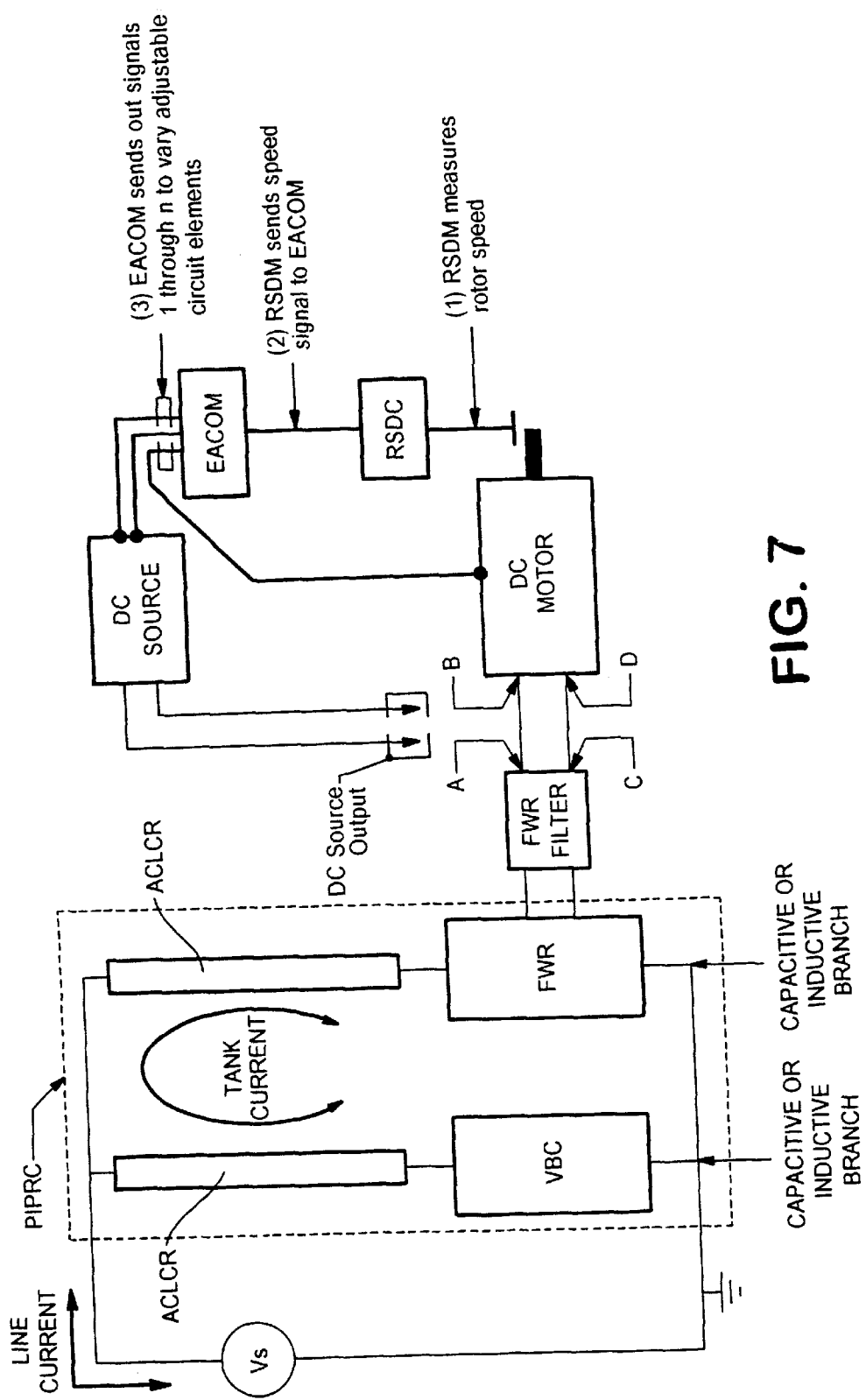
FIG. 7 is a schematic of an insertion of variable voltage arrangement which incorporates rotor speed detection and an electronic apparatus in accordance with the present invention.

FIG. 7 is an illustration of the first of these two methods. A rotor speed detection circuit RSDC constantly measures the rotor's speed. There are numerous ways of determining the rotational speed of the rotor and any of these ways may be used, as long as they do not cause the PIPRC violate its criteria. The RSDC sends a signal indicative of the motor's speed to an electronic apparatus which either (1) computes the value or values or (2) has a matrix or array of precomputed values of adjustable circuit elements in an adjustable DC source. This electronic apparatus (EACOM) sends out signals that set the adjustable element or elements to a value necessary to cause the DC source to output a voltage that will cause criterion three to be met, thereby maintaining the PIPRC. The EACOM could, for example, vary the field of a DC generator, or open and close contacts to bring in or pull out DC batteries, etc. There are numerous combinations of the above that can by employed for a particular design. It is left to a designer to select what type of variable DC source will be used and what will be varied and what will not.

Figure 8:
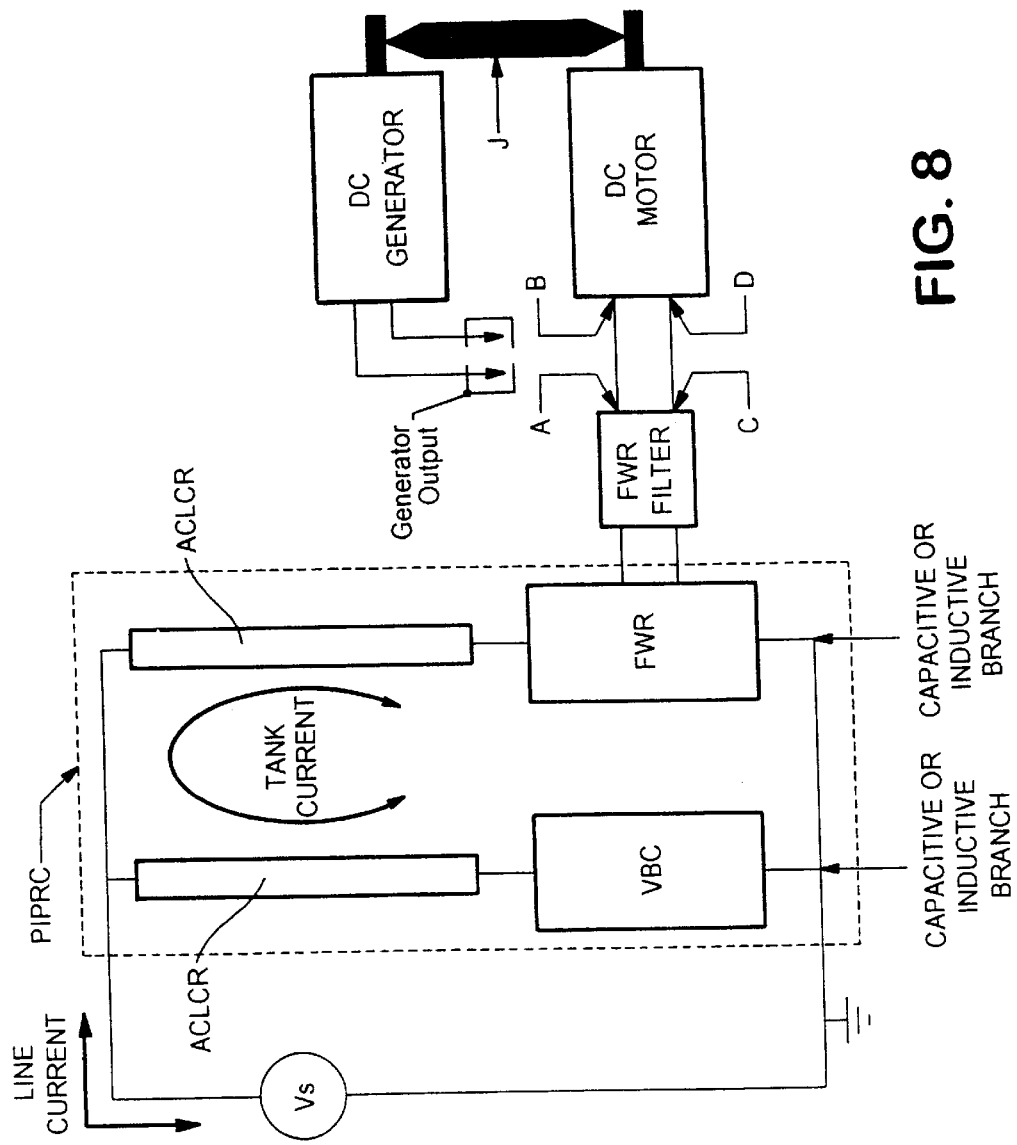
FIG. 8 is a schematic of the insertion of variable voltage arrangement which incorporates a uniquely designed DC generator and transmission in accordance with the present invention.

FIG. 8 shows a second way the above method can be implemented. A DC generator is turned by the DC motor via a designed transmission J. The output of the DC generator is connected between terminals A and B, or C and D, or both. Regardless of the speed ω of the DC motor, the DC generator keeps quotient of the average back emf ABE of the DC motor divided by the internal generated voltage of the DC generator constant. This quotient is called the compensation quotient (CQ). The internal generated voltage of the DC generator is given by the following equation:

$$V = \text{magnetic field} \times \omega \times \text{generator constant},$$

where the magnetic field is measured in Teslas (B), ω is the speed of the armature in rpm, and "generator constant" is a number that is constant for a particular generator. This constant depends on how the generator is electrically constructed, and can vary widely from generator to generator. Factors that determine this constant include: the radius of the armature, the length of the armature, the number of conductors and conversions between systems of units. If for example the constant quotient CQ equals 1.025 the quotient remains equal to 1.025 regardless of the speed ω of the DC motor.

Figure 9:
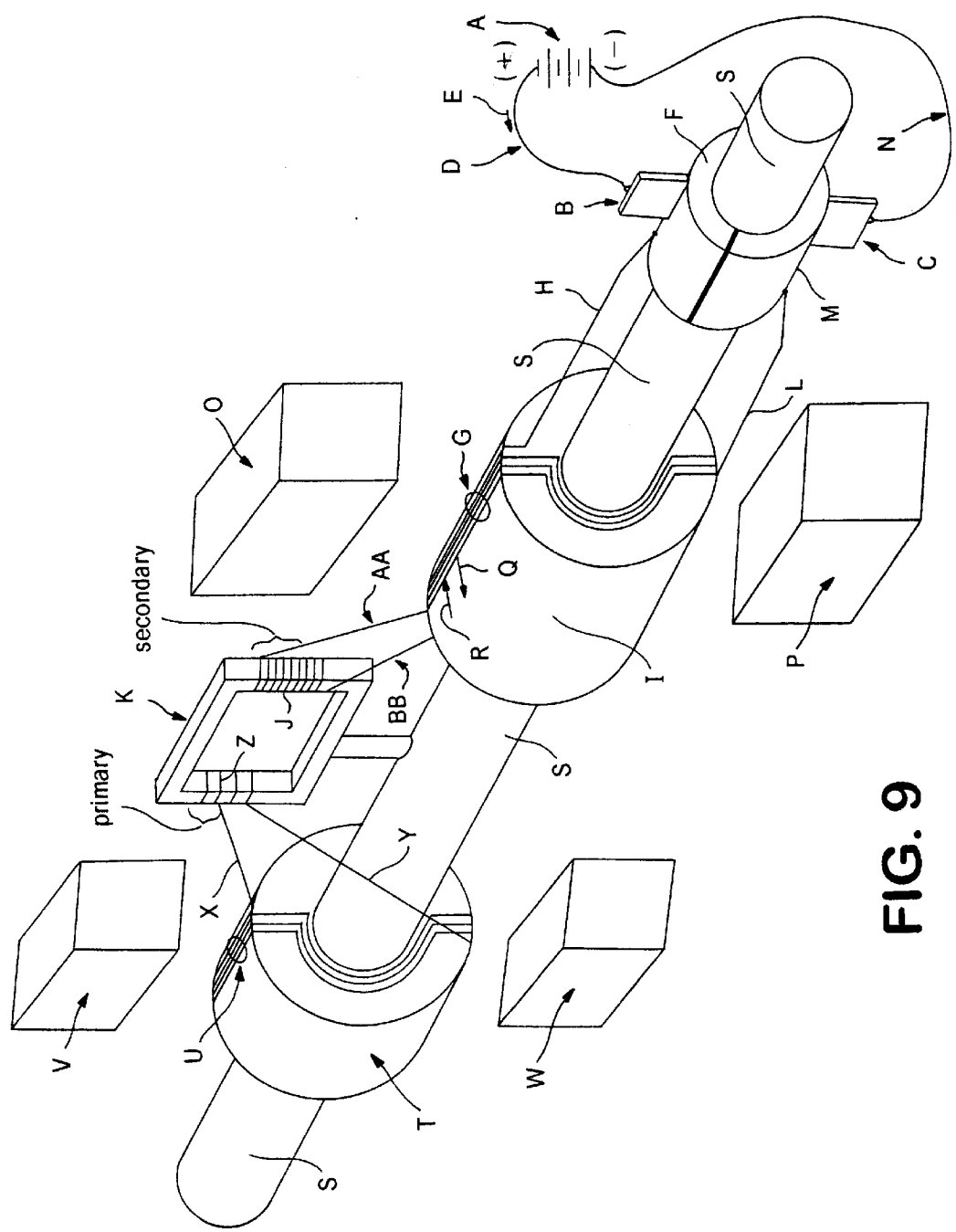
FIG. 9 is an illustration and schematic of the no back emf arrangement motor according to the present invention which is a unique DC motor.

FIG. 9 shows a "no back emf motor" configured according to the present invention. The arrangement of FIG. 9 internally cancels out all or nearly all back emf of the motor.

A DC source A is connected to the motor at brushes B and C. This completes a circuit causing a current to flow in the following manner. Current flows from the positive terminal of A, indicated by the symbol "(+)", to brush B, through conductor D in the direction of arrow E. Current then enters commutator segment F and travels to main armature winding G, through conductor H. The main armature winding G, which is wound on main armature core 1, is an α turn winding, where α is any integer greater than or equal to 1. One of these turns is electrically broken to create two terminals. One terminal is electrically connected to one end of conductor AA. The other end of conductor AA is electrically connected to one end of conductor J. Conductor J is wrapped β number of turn(s) around the cancellation transformer's K core, where β is any integer greater than or equal to 1. These β number of turn(s) make up the secondary of cancellation transformer K. The other end of conductor J is connected to one end of conductor BB. The other end of conductor BB is connected to the other terminal. After the current has traveled through all α turns of the main armature winding G, which includes traveling through conductors AA, J, and BB, it travels through conductor L to commutator segment M. The current then exits commutator segment M, enters brush C and travels through conductor N to the negative side of DC source A, denoted by the symbol "(−)". Main armature core I is positioned between main stator poles O and P and is free to rotate between them. Main stator poles O and P set up magnetic field lines that travel from main stator O to main stator P or vice versa. As current flows though all α windings of the main armature winding G, it flows at a 90 geometrical degree angle, or nearly so, through the magnetic field lines. This causes a force, whose direction is that of arrow Q or arrow R, to be exerted on the conductors in the main armature winding G. This force creates a torque, that causes the following rotating members to rotate either clockwise or counter clockwise: the main armature winding G, the main armature core I, the shaft S, the cancellation transformer K, the commutator segments F and M, the cancellation armature core T, and the cancellation armature winding U. Hence there is now an electrical motor whose rotational velocity ω can vary widely. Though ω can vary widely, all of the rotating members will at all times rotate at ω, no matter what value ω is, because these elements are permanently fixed to one another and/or to shaft S. All components that are not rotating are stationary e.g.; the stators are stationary.

As the main armature windings G rotate at velocity ω, they move through the magnetic field lines. This generates back emf in the main armature windings G. This back emf comes out of main armature windings G, and appears on conductors H and L, commutator segments F and M, brushes B and C, conductors D and N, and on the (+) and (−) terminals of DC source A. The back emf that is generated in the main armature windings G is actually AC, having a waveform similar to that of FIG. 6*a*. The DC source A, however, "sees" the back emf as DC, similar to that of FIG. 6*b* or FIG. 6*c,* because of the mechanical rectification of the commutator segments F and M, and brushes B and C. For example, say in the current FIG. 9, with the main armature winding G positioned as is, the back emf is causing conductor H to be some positive (+) voltage greater than conductor L. Therefore, conductor H would have some (+) voltage, and for simplicity, say conductor L is 0 voltage. Since conductor H is electrically connected to commutator segment F, commutator segment F is at that (+) voltage and puts this voltage on brush B, conductor D, and (+) terminal of DC source A. Similarly, because conductor L is electrically connected to commutator segment M, brush C, and conductor N, its 0 voltage is put on the (−) or 0 voltage terminal of DC source A. When, however, the main armature winding and core, G and I, rotate to the point where the main armature winding G has made a 180 geometrical degree revolution, the polarity of the back emf would then make conductor L more positive than conductor H, because the winding's relative position to the magnetic field lines has reversed. With this positioning, conductor L is at some (+) voltage, and conductor H is at 0 voltage. This reverse in polarity shows that the generated back emf is AC in nature. But the very rotation that caused the polarity to change, has also moved commutator segment M in contact with brush B, and commutator segment F in contact with brush C. So brush B and conductor D still see (+) voltage, and brush C and conductor N still see 0 voltage. Therefore, the DC source "sees" no change in the polarity of the back emf. Because of this continuous mechanical rectification, the DC source A never sees a change in the polarity of the back emf. So, even though the actual back emf generated in the main armature winding G is AC, the DC source A always "sees" it as DC.

The "no back emf" motor cancels out all or nearly all of this back emf in the following way. As the motor rotates at velocity ω, the cancellation armature winding U and cancellation armature core T, also rotate at velocity ω, since, as was stated before, they are rotating members. The cancellation armature winding U is made up of δ turns, where δ is any integer greater than or equal to one. As the cancellation armature winding U rotates, the δ turns move through another set of invisible magnetic field lines set up by cancellation stator poles V and W. These magnetic field lines extend from cancellation stator V to cancellation stator W or vice versa. The cancellation armature core T is positioned between cancellation stator poles V and W is free to rotate between them. Because the cancellation armature winding U moves through these magnetic field lines, an AC emf or voltage is generated in the cancellation armature winding U for the same reason that an AC back emf was generated in the main armature winding G. Conductor X is electrically connected to one end of the cancellation armature winding U. Conductor Y is electrically connected to the other end of the cancellation armature winding U. Both conductors X and Y, extend and electrically connect to conductor Z that is wrapped ψ number of turn(s) around the cancellation transformer's K core, where ψ is any integer greater than or equal to 1. Conductor X electrically connects to one end of conductor Z, and conductor Y electrically connects to the other end of conductor Z. Conductor Z, with its ψ number of turn(s), makes up the primary of cancellation transformer K. Because of conductors X and Y, the AC voltage generated in cancellation armature winding U is placed on conductor Z which can also be called primary Z. The AC voltage placed on primary Z appears on conductor J, which, as was previously stated, is actually the secondary of cancellation transformer K, according to the following cancellation transformer equation:

$$VJ = VPZ \times (\beta/\psi) \times CC,$$

where VJ is the voltage on conductor J, VPZ is the voltage on primary Z, and CC is the coefficient of coupling. Both β and ψ mean the same as they previously did, and (β/ψ) is known as the turns ratio of cancellation transformer K. The coefficient of coupling is a number between 0 and 1 that represents how well the primary and secondary windings are magnetically coupled together.

The terms VPZ, β, ψ, and CC in the cancellation transformer equation are selected to cause VJ to equal the back emf in main armature winding G, or be close enough to it so that a PIPRC is realized and maintained, regardless of how the back emf varies over time. The direction of the magnetic field lines between cancellation stator poles V and W, the connections of conductors X and Y to primary Z, and the winding senses of primary Z and conductor J, the connections of conductors AA and BB from conductor J to the terminals in main armature winding G, are all selected to cause VJ to be 180 electrical degrees out of phase with the back emf in the main armature winding G, or be close enough to it so that a PIPRC is realized and maintained. The term "winding sense" refers to the direction in which a conductor is wound around a transformer's core.

Because VJ is engineered in the above mentioned way, and because conductors AA and BB place this voltage into main armature winding G, it removes all of the back emf in main armature winding G, or is close enough to removing all of the back emf so that a PIPRC is realized and maintained. If the back emf is 10 volts, then VJ will equal −10 volts, or be close enough to −10 volts so that a PIPRC is realized and maintained. If the back emf is 0 volts, then VJ will equal 0 volts, or be close enough to 0 volts so that a PIPRC is realized and maintained. If the back emf is −7 volts, then VJ will equal 7 volts, or be close enough to 7 volts so that a PIPRC is realized and maintained, etc. VJ and the back emf in main armature winding G mutually cancel each other. Therefore main armature winding G sees the voltage from DC source A, and either no other voltage, or a residue of either VJ or the back emf in main armature winding G. This residue, if it exists, is engineered to be small enough so that a PIPRC is realized and maintained. The view shown in FIG. 9 is illustrative only and is not intended to show winding senses, the exact physical appearance, nor the exact physical measurements or proportions of the elements of a no back emf configured motor according to the present invention.

The no back emf method of FIG. 9 is shown on a simplified DC motor. Normally, DC motors are more complex than that shown in FIG. 9. FIG. 9 shows a two pole stator (main stator poles O and P), a one coil armature (main armature winding G), two commutator segments (commutator segments F and M), and two brushes (brushes B and C). FIG. 10 is a front view of the motor of FIG. 9. A DC motor can have, however, more than two poles in the stator. It can have anywhere from 2 poles to an arbitrary number n, where n is any positive integer greater than 2. These n stator poles may also include interpoles. Also, a DC motor can have more than one winding in its armature. It can have anywhere from 1 winding to an arbitrary number x, where x is any positive integer greater than 1. Furthermore, a DC motor can have more than 2 commutator segments. It can have anywhere from 2 commutator segments to an arbitrary number y, where y is any positive integer greater than 2. Finally, a DC motor can have more than 2 brushes. It can have anywhere from 2 brushes to an arbitrary number z, where z is any positive integer greater than 2. Therefore, in the scope of the no back emf motor, a no back emf motor will have an n pole main stator, which may or may not include interpoles, x main armature winding(s), y commutator segment(s), and z brush(es). To remove the back emf, the no back emf motor will have x cancellation armature winding(s), one for each main armature winding; and an n pole cancellation stator, one for each main stator pole, and if desired, each interpole.

The use of interpoles in the cancellation stator is optional. Interpoles are used to correct the distortion of the stator's magnetic field. This distortion is caused by the magnetic field created by armature currents. Depending on the particular design of the no back emf motor, the cancellation armature currents may be very small, hence creating very little cancellation stator magnetic field distortion. In this case a designer may choose to not use cancellation interpoles in the cancellation stator, whereas he may choose to not use interpoles in the main stator of the main stator of the same motor, if it has or will have substantial main stator magnetic field distortion.

These elements are labeled in FIG. 9 as U, V, and W respectively. There will also be x cancellation transformer (s), x conductor X(s), x conductor Y(s), x conductor Z(s), x conductor J(s), x conductor AA(s), and x conductor BB(s); that is, one for each cancellation armature winding. These elements are labelled in FIG. 9 as K, X, Y, Z, J, AA, and BB respectively. These elements are engineered to function exactly the same way as they did in the analysis of FIG. 9. Therefore, the back emf in each main armature winding is completely removed, or enough of it is removed so that a PIPRC is realized and maintained.

Figure 11:
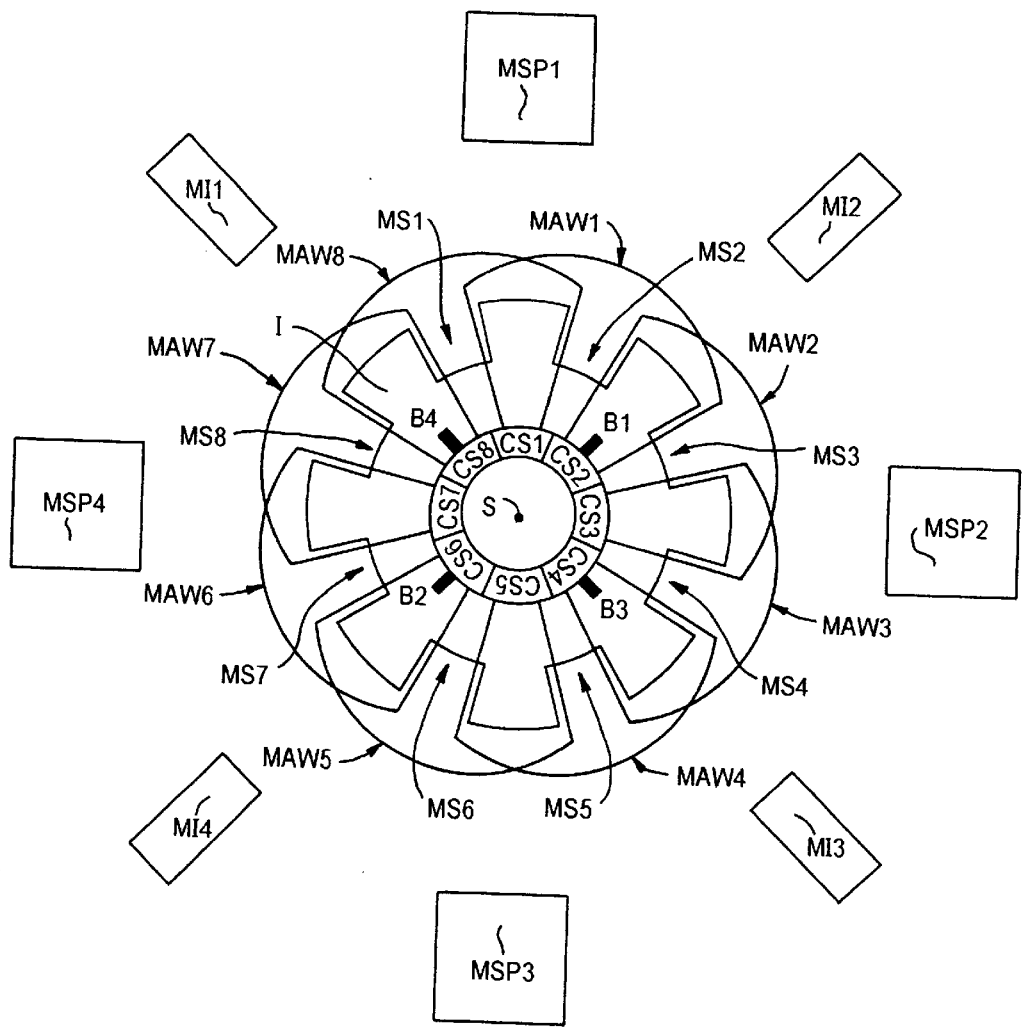
FIG. 11 is an illustration and schematic of a frontal view of a main armature and stator arrangement according to the present invention.
Figure 12:
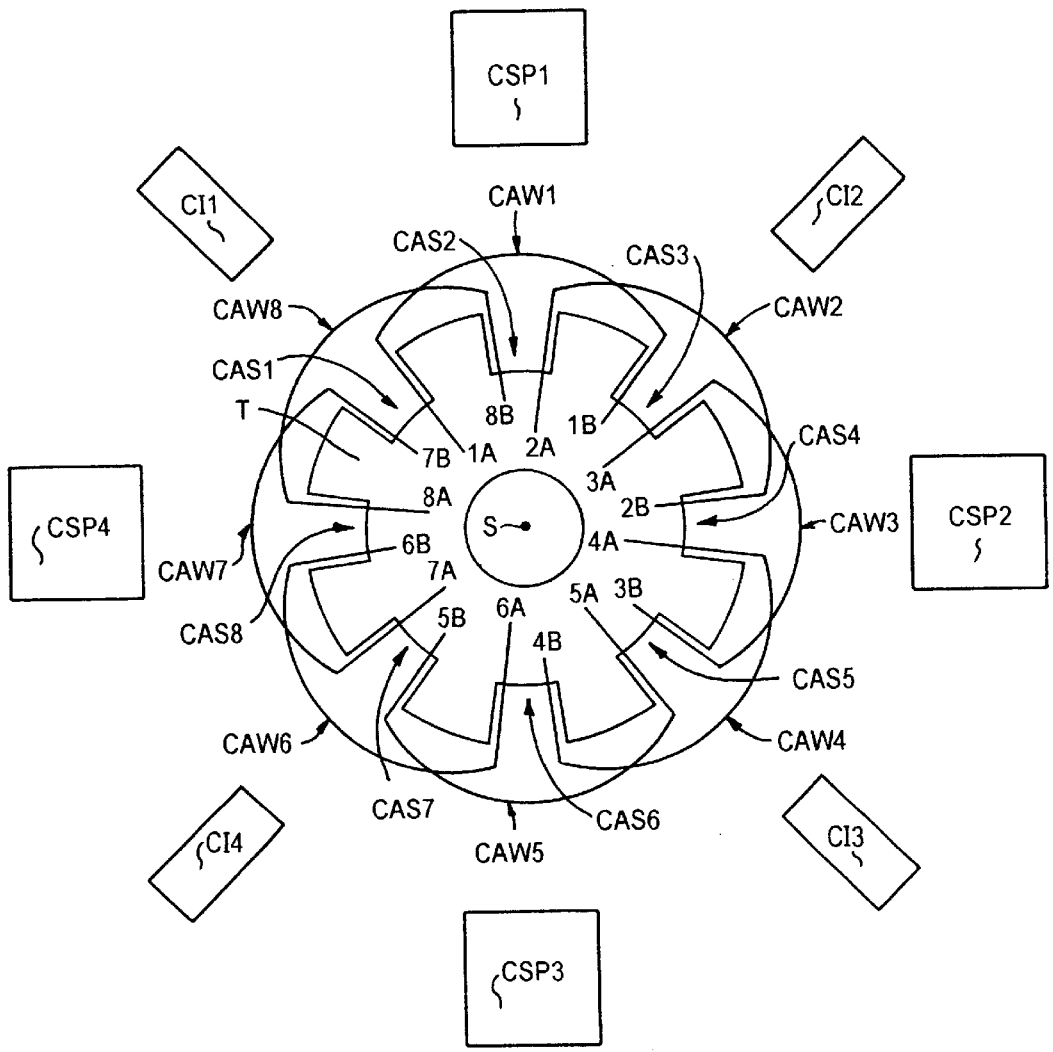
FIG. 12 is an illustration and schematic of a frontal view of a cancellation armature and stator arrangement of another embodiment of the motor according to the present invention.
Figure 13:
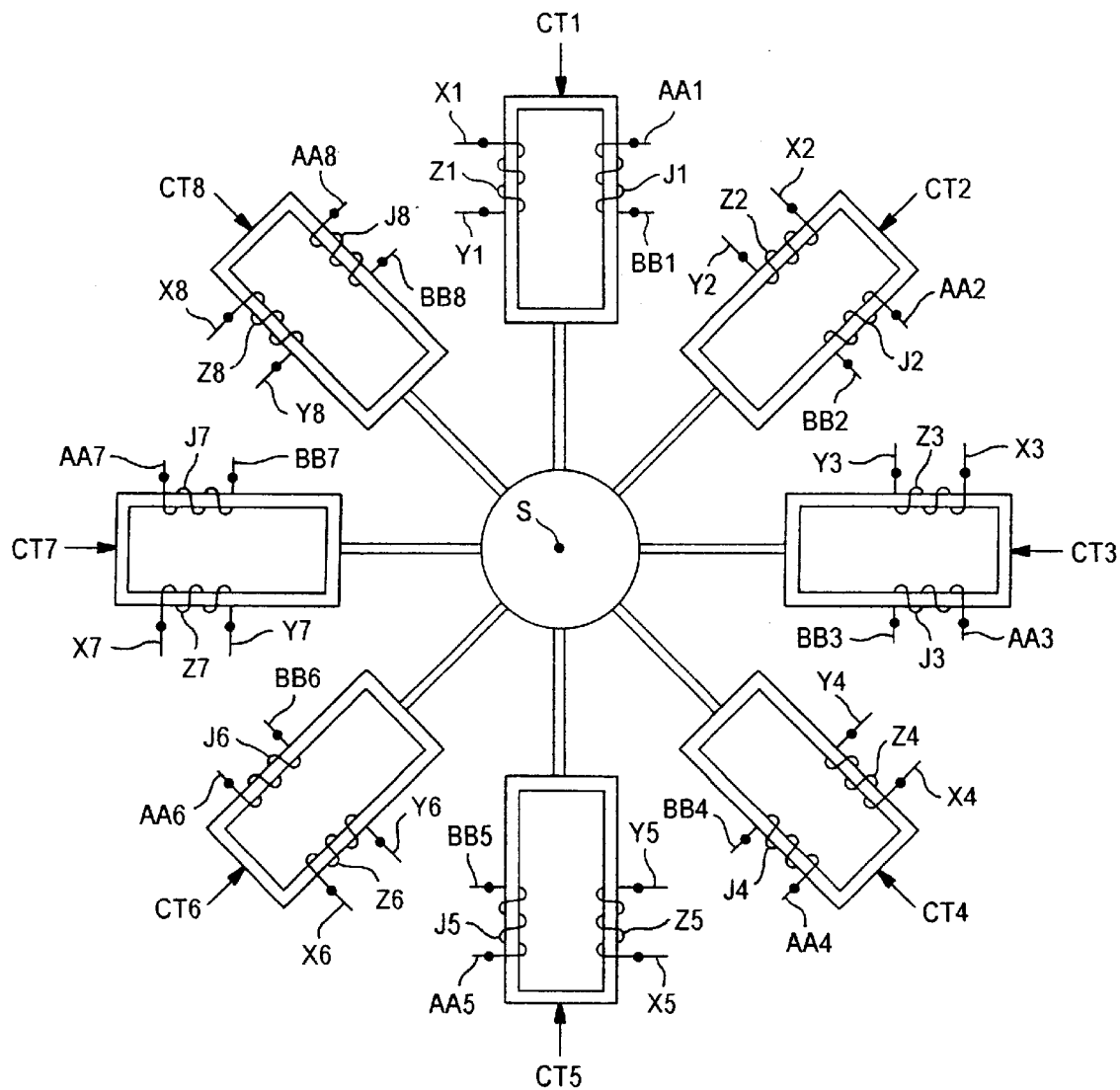
FIG. 13 is an illustration and schematic of a frontal view of a cancellation transformer arrangement of another embodiment of the motor according to the present invention.

The following discussion will give an example of how the no back emf method applies to these more complex DC motors. FIG. 11 shows a frontal view of a more complex no back emf motor. It has an eight pole main stator made up of four main stator poles and four main interpoles. The main stator poles are labelled MSP1, MSP2, MSP3, and MSP4; and the main interpoles are labeled MI1, MI2, II3, and MI4. It also has eight main armature windings labeled MAW1 through MAW8. Each main armature winding is an equal α turn winding, where α is any integer greater than or equal to 1. These eight main armature windings are wound in eight main armature slots, labeled MS1 through MS8, on main armature core 1. Each main armature winding travels the full length of the main armature core 1, as did the main armature winding G in FIG. 9. For example, main armature winding one, MAW1, starts by being electrically connected to commutator segment one, CS1. Next, its α turns are wrapped in the following manner: (A) in and through main armature slot one, MS1; (B) around the back of main armature core I to main armature slot three, MS3; (C) in and through main armature slot three, MS3; and (D) across the front of main armature core I to main armature slot one, MS1, again. After the last turn is wrapped, the other end of main armature winding one, MAW1, is electrically connected to commutator segment two, CS2. The other main armature windings, MAW2 through MAW8, are wound and connected in the same manner, but each is wrapped in its own slots, as is shown in FIG. 11, and each is connected to its own commutator segments, as is also shown in FIG. 11. Next, this no back emf motor has eight commutator segments labelled CS1 through CS8. Lastly, it has 4 brushes labeled B1 through B4. Two of these brushes are electrically connected to the positive terminal of the DC source, and the other two are connected to the negative terminal of the DC source. Commutator segments CS1 through CS8, and main armature core I are solidly fixed to, and rotate with shaft S, like that of FIG. 9. Also like that of FIG. 9, brushes B1 through B4, and stator poles MSP1 through MSP4 and MI1 through MI4 are non-rotating elements. On shaft S with the arrangement of FIG. 11 are: (A) the arrangement of FIG. 13 which is the cancellation transformer arrangement, and lastly, and (B) the arrangement of FIG. 12 which is the cancellation stators and cancellation armature windings arrangement. FIG. 12 will be discussed first. Here there are 4 cancellation stator poles labeled CSP1 through CSP4, and four cancellation interpoles labeled CI1 through CI4. Next, there are eight cancellation armature windings, labeled CAW1 through CAW8, all wound in eight slots, labeled CAS1 through CAS8, in cancellation armature core T. To simplify the explanation of this no back emf motor, the ends of each cancellation armature winding are labeled. The ends of cancellation armature winding one, CAW1, are labeled 1A and 1B. The ends of cancellation armature winding two, CAW2, are labeled 2A and 2B. The ends of the other cancellation armature windings CAW3 through CAW8 are similarly labeled, 3A and 3B through 8A and 8B, respectively. Each cancellation armature winding is an equal δ turn winding, where δ is any integer greater than or equal to 1. These eight cancellation armature windings are wound in eight cancellation armature slots, labeled CAS1 through CAS8, on cancellation armature core T. Each cancellation armature winding travels the full length of the cancellation armature core T, as did the cancellation armature winding U in FIG. 9. For example, cancellation armature winding one, CAW1, starts at its end, 1A. Its δ turns are then wrapped in the following manner: (A) in and through cancellation armature slot one, CAS1; (B) around the back of cancellation armature core T to cancellation armature slot three, CAS3; (C) in and through cancellation armature slot three, CAS3; and (D) across the front of cancellation armature core T to cancellation armature slot one, CAS1, again. After the last turn is wrapped, we come to end 1B. The other cancellation armature windings, CAW2 through CAW8, are wound in the same manner, but each is wrapped in its own slots, as is shown in FIG. 12. Like FIG. 9, the cancellation armature core T is firmly fixed on shaft S and rotates with shaft S. Also like FIG. 9, the eight cancellation stators of FIG. 12 are non-rotating elements. FIG. 13 will now be introduced to continue the explanation. One end of cancellation armature winding one, CAW1, either 1A or 1B, is electrically connected to conductor X1, labeled X1, in FIG. 13. The other end of cancellation armature winding one, CAW1, is electrically connected to conductor Y1, labeled Y1, in FIG. 13. The other ends, 2A and 2B through 8A and 8B, of the other cancellation armatures, CAW2 through CAW8, are similarly electrically connected to their respective conductors X2 and Y2 through X8 and Y8. The other end of conductor X1, X1, is electrically connected to one end of conductor Z1. The other end of conductor Y1, Y1, is electrically connected to the other end of conductor Z1. The other ends of conductors X2 through X8, and the other ends of conductors Y2 through Y8 are similarly connected to the ends of their respective conductors Z2 through Z8. Conductors Z1 through Z8, are each wrapped ψ times around their respective cancellation transformers CT1 through CT8, where ψ is any integer greater than or equal to 1. As in FIG. 9, conductors Z1 through Z8 make up the primaries of their respective cancellation transformers CT1 through CT8. All cancellation transformers CT1 through CT8 are permanently fixed to, and rotate with shaft S. There are eight conductor Js, J1 through J8, that are each wound β number of times around cancellation transformers CT1 through CT8, respectively, as shown. β is any integer greater than or equal to 1. These eight conductor Js, make up the secondaries of their respective cancellation transformers. There are eight conductor AAs, AA1 through AA8, that are electrically connected to one end of conductors J1 through J8, respectively, as shown. Similarly, there are eight conductor BBs, BB1 through BB8, that are electrically connected to the other ends of conductors J1 through J8, as shown.

A similar analysis to that of FIG. 9 now follows. In fact, a good way to look at this new motor is to realize that the no back emf circuit of FIG. 9 has been multiplied eight times and combined into the one no back emf motor shown in FIGS. 11, 12, and 13. As the rotating elements in FIG. 11 rotate on shaft S at rotational velocity ψ, each main armature winding, MAW1 through MAW8, acquires a back emf, for the same reason that main armature winding G did in FIG. 9. The rotating elements in FIG. 12 also rotate on shaft S at rotational velocity ψ. As cancellation armature windings CAW1 through CAW8 rotate, an AC voltage forms in each winding for the same reason that it did in cancellation armature winding U in FIG. 9. Each cancellation armature winding, CAW1 through CAW8, through their respective ends 1A and 1B through 8A and 8B, sends its AC voltage to conductors X1 and Y1 through X8 and Y8, respectively. The other end of each pair of conductors X1 and Y1 through X8 and Y8 electrically connect to opposite ends of conductors Z1 through Z8, respectively. An AC voltage therefore forms across conductors J1 through J8, for the same reason it did across conductor J in FIG. 9. The AC voltage that appears across each conductor J1 through J8 is called VJ1 through VJ8, respectively. Each voltage, VJ1 through VJ8, is computed by using the same equation used to compute VJ in FIG. 9. For example, VJ1 is computed by using the following equation:

$$VJ1 = VPZ1 \times (\beta 1/\psi 1) \times CC1,$$

where VJ1 stands for the voltage on conductor J1, VPZ1 stands for the voltage on primary Z1, and CC1 stands for the coefficient of coupling of cancellation transformer one, CT1. $\beta 1$ is the number of turns in conductor J1, and $\psi 1$ is the number of turns in conductor Z1, and $(\beta 1/\psi 1)$ is the turns ratio of cancellation transformer one, CT1. VJ2 through VJ8 are similarly computed by adjusting the numbers of the right side of the equation from 2 to 8, respectively, for each voltage. Each pair of conductors AA1 and BB1 through AA8 and BB8, are connected to opposite ends of conductors J1 through J8, respectively. Therefore, voltages VJ1 through VJ8 appear across the other ends of each pair of conductors, AA1 and BB1 through AA8 and BB8, respectively. One of the turns in each main armature winding MAW1 through MAW8 is broken to create two terminals in each winding. The other ends of conductors AA1 and BB1 through AA8 and BB8 are then electrically connected to opposite pairs of terminals in main armature windings MAW1 through MAW8, respectively. The terms VPZ1 through VPZ8, $\beta 1$ through $\beta 8$, $\psi 1$ through $\psi 1$, and CC1 through CC8 are engineered to cause VJ1 through VJ8 to equal the back emfs in main armature windings MAW1 through MAW8 respectively, or be close enough to them so that a PIPRC is realized and maintained, no matter how the back emfs vary overtime. The direction of the magnetic field lines between the cancellation stator poles CSP1 through CSP4 and CI1 through CI4, the connections of conductors X1 and Y1 through X8 and Y8 to primaries Z1 through Z8, the winding senses of primaries Z1 through Z8 and conductors J1 through J8, the connections of conductors AA1 and BB1 through AA8 and BB8 from conductors J1 through J8 to the terminals created in the main armature windings, respectively, are all engineered to cause voltages VJ1 through VJ8 to be 180 electrical degrees out of phase with the back emfs in main armature windings MAW1 through MAW8, respectively, or be close enough to them so that a PIPRC is realized and maintained.

Because voltages VJ1 through VJ8 are engineered in the above mentioned way, and because conductors AA1 and BB1 through AA8 and BB8 place their voltages into their respective main armature windings MAW1 through MAW8, they remove all of the back emfs in main armature windings MAW1 through MAW8, or are close enough to removing all of the back emfs so that a PIPRC is realized and maintained.

If the back emfs of MAW1 through MAW8 are 10 volts, 9 volts, 7.7 volts, 5.5 volts, 0 volts, -3.2 volts, -4.9 volts, and -8.3 volts; then voltages VJ1 through VJ8 will equal -10 volts, -9 volts, -7.7 volts, -5.5 volts, 0 volts, 3.2 volts, 4.9 volts, and 8.3 volts; or be close enough to these voltages that a PIPRC is realized and maintained. If the back emfs of MAW1 through MAW8 are -12 volts, -11 volts, -9.7 volts, -7.5 volts, 0 volts, 5.2 volts, 6.9 volts, and 10.3 volts; then voltages VJ1 through VJ8 will equal 12 volts, 11 volts, 9.7 volts, 7.5 volts, 0 volts, -5.2 volts, -6.9 volts, and -10.3 volts; or be close enough to these voltages that a PIPRC is realized and maintained., etc. VJ1 through VJ8, and the back emfs in main armature windings MAW1 through MAW8, all mutually and respectively cancel each other. Therefore, main armature windings MAW1 through MAW8 see the voltage from the DC source, and either no other voltage, or a residue of VJ1 through VJ8 respectively, or the back emf in that main armature winding. This residue, if it exists, is engineered to be small enough so that a PIPRC is realized and maintained. The views shown in FIGS. 10 through 13 are illustrative only and are not intended to show winding senses, the exact physical appearance, nor the exact physical measurements or proportions of the elements of a no back emf motor in accordance with the present invention. The DC source spoken of for the no back emf method of FIGS. 9, 11, 12, and 13 is identical to that shown in FIG. 4. As was previously discussed, the actual DC signal comes out of the FWR or FWR filter. The no back emf motor is connected to the FWR or FWR filter in the same fashion as the motor labeled "DC motor" in FIG. 4. For the no back emf method, no voltage is inserted between terminals A and B nor terminals C and D of FIG. 4.

Because the circuitry of the present invention removes all or nearly all of the back emf in a DC motor, it negates the motor's normal ability to draw various currents for various loads. For a normal DC motor, when its load is increased, its back emf lessens causing more armature current to flow. The increased current increases the torque of the motor. This increase in torque enables the motor to handle the increased load. If, however, the load is decreased, the motor's back emf increases causing less armature current to flow. The lower amount of armature current is just enough for the motor to handle the lessened load. A DC motor configured in accordance with the present invention cannot do this because the present invention removes all back emf from a DC motor, or removes enough back emf so that a PIPRC is realized and maintained. The only way of varying the amount of current flowing through the brushes, commutators, armature winding or windings, and stator windings if desired, of a motor according to the present invention is to vary the AC source voltage Vs of FIGS. 4, 7, and 8. The torque and speed of the motor can be varied by varying the AC source voltage Vs and/or the magnetic field intensity of the stator windings which may or may not include interpoles.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An arrangement for powering a DC motor having an output shaft and an AC power source, the arrangement comprising:

a parallel resonant tank circuit connected to the AC source and having a capacitive branch and an inductive branch connected in parallel to generate a resonating tank current;

a rectifier connected to the parallel resonant circuit to transform the AC voltage to DC voltage, and a DC motor having its armature and if desired its stator, connected to the rectifier to receive DC voltage therefrom.

2. The arrangement of claim 1, wherein the parallel resonant tank circuit has a quotient derived by dividing tank current by line current, the quotient being greater than one, the quotient being large enough to allow the percent efficiency of the DC motor to be greater than or equal to 95%; and The arrangement having circuitry for removing enough back emf out of the DC motor, so that Q remains greater than one and large enough to allow the percent efficiency of the DC motor to be greater than or equal to 95.

3. The arrangement of claim 1, wherein the rectifier of the parallel resonant tank circuit is a full wave rectifier electrically connected in series with one of the two branches of the parallel resonant tank circuit.

4. The arrangement of claim 3, wherein electrical parallel resonant tank circuit contains a voltage balancing circuit electrically connected in series with one of the branches of the circuit opposite to that in which the full wave rectifier is located, the voltage balancing circuit having a voltage drop thereacross substantially equaling the voltage drop across the full wave rectifier.

5. The arrangement of claim 3, wherein the DC output of the full wave rectifier is connected to the DC motor through a filter.

6. The arrangement of claim 3, wherein the DC output of the full wave rectifier is electrically connected to the DC motor with a variable DC voltage between the full wave rectifier and a connection to the input terminals of the DC motor and further including a means for automatically varying the variable DC motor to minimize the influence of back emf of the DC motor.

7. The arrangement of claim 1 further including a secondary armature on the output shaft of the DC motor, the secondary armature having an armature core which has the same number of windings as a first armature, each secondary armature winding being dedicated to the removal of the AC voltage on one main armature winding.

8. The arrangement of claim 7 further comprising a secondary stator disposed around the secondary armature, the secondary stator having as many stator windings as a stator first.

9. The arrangement of claim 7 further comprising a bank of transformers on the shaft of the DC motor, each transformer having a primary winding and secondary winding, the number of transformers being equal to the number of secondary armature windings with each transformer being dedicated to one secondary armature winding, and therefore dedicated to one main armature winding.

10. The arrangement of claim 7, wherein the electrical connections of each secondary winding to its respective transformer being such that the AC voltage generated in each secondary winding is applied to the terminals of the primary winding of that transformer.

11. The arrangement of claim 10, wherein the electrical connections of each transformer to its respective main armature winding is such that the AC secondary voltage is placed in the main armature winding by dividing one winding of the main armature winding, thereby creating two terminals, to which terminals the secondary voltage terminals of the transformer are connected.

12. The arrangement of claim 7, wherein the AC voltage placed in each secondary armature winding cancels AC voltage generated in each main armature winding so as to minimize back emf.

13. The arrangement of claim 6 further comprising a rotor speed detection means which constantly monitors the rotor speed of the DC motor and sends a signal representative of the rotor speed to an electronic apparatus which computes and outputs the needed value of a variable DC source elements or a variable DC motor elements, and sends out a signal that varies this adjustable element to minimize back emf.

14. The arrangement of claim 6, wherein current flowing through the brush, the commutator, the armature winding, and the stator winding is varied by varying the voltage of the AC source.

15. The arrangement of claim 6, wherein speed and torque is varied by varying the voltage of the AC source, and/or the magnetic field intensity of the stator windings.

16. The arrangement of claim 3, wherein the DC output of the full wave rectifier is electrically connected to the DC motor through a DC generator coupled to the rotor of the DC motor via a transmission to maintain the output voltage of the DC generator at a level to minimize the influence of back emf on the DC motor.

* * * * *